United States Patent
Mason et al.

(10) Patent No.: US 10,321,306 B2
(45) Date of Patent: Jun. 11, 2019

(54) NETWORK DEVICE SELECTIVE SYNCHRONIZATION

(71) Applicant: Aerohive Networks, Inc., Milpitas, CA (US)

(72) Inventors: Geoffrey Joseph Mason, Auckland (NZ); Shruti Narayan, Sunnyvale, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 102 days.

(21) Appl. No.: 15/262,707

(22) Filed: Sep. 12, 2016

(65) Prior Publication Data
US 2017/0374548 A1   Dec. 28, 2017

Related U.S. Application Data

(60) Provisional application No. 62/354,665, filed on Jun. 24, 2016.

(51) Int. Cl.
| | | |
|---|---|---|
| *H04W 8/24* | (2009.01) | |
| *H04L 29/08* | (2006.01) | |
| *H04W 12/04* | (2009.01) | |
| *H04L 29/06* | (2006.01) | |
| *H04W 12/08* | (2009.01) | |
| *H04L 9/08* | (2006.01) | |
| *H04L 9/12* | (2006.01) | |
| *H04W 84/12* | (2009.01) | |

(52) U.S. Cl.
CPC ............ *H04W 8/245* (2013.01); *H04L 9/0833* (2013.01); *H04L 9/0861* (2013.01); *H04L 9/12* (2013.01); *H04L 63/062* (2013.01); *H04L 63/105* (2013.01); *H04L 67/10* (2013.01); *H04W 12/04* (2013.01); *H04W 12/08* (2013.01); *H04W 84/12* (2013.01)

(58) Field of Classification Search
CPC ... H04W 8/245; H04W 84/12; H04W 812/04; H04W 812/08; H04L 67/10; H04L 9/08; H04L 63/062; H04L 63/105; H04L 9/0833; H04L 9/0861; H04L 9/12
See application file for complete search history.

(56) References Cited

U.S. PATENT DOCUMENTS

| | | | |
|---|---|---|---|
| 2015/0040195 A1* | 2/2015 | Park | H04W 12/06 726/4 |
| 2015/0222604 A1* | 8/2015 | Ylonen | H04L 63/062 713/171 |

* cited by examiner

*Primary Examiner* — Jianye Wu
(74) *Attorney, Agent, or Firm* — Law Office of William Ahmann LLP

(57) ABSTRACT

Techniques for selectively synchronizing network devices to authenticate wireless device to access a network using a key. A system utilizing such techniques can include a unique pre-shared key assignment system and a network device selective synchronization system. A method utilizing such techniques can include unique pre-shared key assignment and selective synchronization management.

20 Claims, 7 Drawing Sheets

US 10,321,306 B2

NETWORK DEVICE SELECTIVE SYNCHRONIZATION

CROSS-REFERENCE TO RELATED APPLICATIONS

The present application claims priority to U.S. Provisional Patent Application No. 62/354,665, filed on Jun. 24, 2016, which is all incorporated by reference herein.

DETAILED DESCRIPTION

Figure 1:
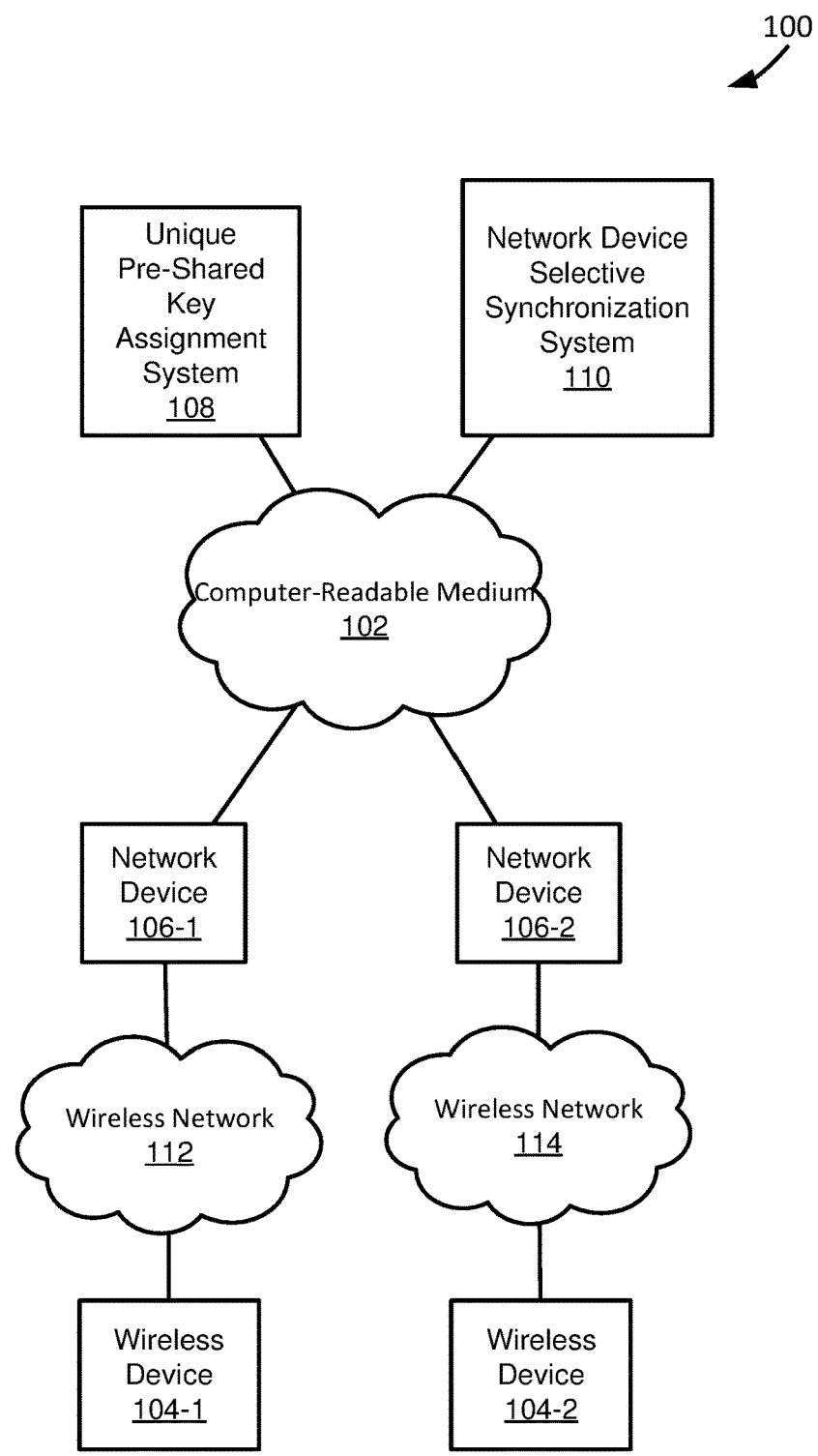
FIG. 1 depicts a diagram of an example of a system for synchronizing network devices to authenticate wireless devices using unique pre-shared keys.

FIG. 1 depicts a diagram 100 of an example of a system for synchronizing network devices to authenticate wireless devices using unique pre-shared keys. The diagram 100 includes a computer-readable medium 102, a first wireless device 104-1, a second wireless device 104-2, a first network device 106-1, a second network devices 106-2, a unique pre-shared key assignment system 108, and a network device selective synchronization system 110. In the example system shown in FIG. 1, the first wireless device 104-1 is coupled to the first network device 106-1 through the wireless network 112, the second wireless device 104-2 is coupled to the second network device 106-2 through the wireless network 114, and the first and second network devices 106-1 and 106-2, the unique pre-shared key assignment system 108, and the network device selective synchronization system 110 are coupled to each other through the computer-readable medium 102. A system similar to that illustrated in the example of FIG. 1 may or may not have multiple network devices (not shown) coupled to the computer-readable medium 102 and wireless networks 112 and 114 and/or network devices (not shown) coupled to the computer-readable medium 102 and other wireless networks (not shown) that together form an extended service set (ESS) or a wireless portion of some other enterprise network. Additionally, the wireless networks 112 and 114 may be part of the same wireless network or be part of different wireless networks.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102 and other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors, at least partially implemented in hardware, or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In the example of FIG. 1, the first and second wireless devices 104-1 and 104-2 are intended to represent applicable devices for sending and receiving data through a wireless network. In various implementations, the first and second wireless devices 104-1 and 104-2 can include a communication engine configured to use a key for authenticating the first and second wireless devices 104-1 and 104-2 for communicating through a wireless and/or backend network. The first and second wireless devices 104-1 and 104-2 can use a unique pre-shared key for network authentication. A pre-shared key can be a key provided to a device prior to authentication using the key. As used in this paper, a unique pre-shared key is a private key used for network authentication that is uniquely associated with a set of devices. In a specific implementation, the set consists of one device. Instead or in addition, the set can consist of devices associated with a particular person, profile, or account. For example, MAC addresses of a set of devices and/or a set of persons, profiles, or accounts can be bound to a unique pre-shared key, thereby associating the device(s), person(s), profile(s), or account(s) with the unique pre-shared key. In a specific implementation, the first and second wireless devices 104-1 and 104-2 are uniquely associated with user accounts. For example, the first and second wireless devices 104-1 and 104-2 can be uniquely associated with respective student accounts for students in a classroom. In various implementations, the first and second wireless devices 104-1 and 104-2 can be thin wireless devices or ultra-thin wireless devices.

In a specific implementation, the first and second wireless devices 104-1 and 104-2 act as or include a station, by including a wireless interface through which it can be coupled through a Wi-Fi connection to a network device. A station, as used in this paper, can be referred to as a device with a media access control (MAC) address and a physical layer (PHY) interface to a wireless medium that complies with the IEEE 802.11 standard. Thus, for example, the wireless devices can be referred to as stations, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the first and second wireless devices 104-1 and 104-2 function to provide authentication data for use in network authentication of the first and second wireless devices 104-1 and 104-2 through the first and second wireless networks 112 and 114. Instead or in addition, the network authentication can be at (as opposed to through) the first and second wireless networks 112 and 114. In various implementations, authentication data can include a key, data generated using a key, user data describing a user of the first and second wireless devices 104-1 and 104-2, and/or device data, e.g. MAC addresses of the first and second wireless devices 104-1 and 104-2. The first and second wireless devices 104-1 and 104-2 can provide authentication data generated using unique pre-shared keys. For example, the first and second wireless devices 104-1 and 104-2 can provide corresponding unique pre-shared keys bound to the first and second wireless devices 104-1 and 104-2 to gain access to a network at or through the first and second wireless networks 112 and 114.

Using keys instead of certificates reduces the complexity in onboarding a plurality of devices. For example, if a user has problems with a certificate, they have to go through the enrollment process to obtain a certificate again, which often requires assistance from network administrators. Conversely, in being key-based, if a user is experiencing problems with network authentication, a network administrator can remotely trouble-shoot a device of the user and may simply redistribute a key to the appropriate device(s). As a result, burdens on network administrators are reduced. This becomes increasingly important in situations where thousands of devices are onboarded. Using unique pre-shared keys, as opposed to public pre-shared keys, as part of onboarding devices is advantageous as the greater the number of devices onboarded using a public pre-shared key, the greater the chances are the public pre-shared key will be compromised, e.g. used or the potential to be used to gain unauthorized access to a network.

In the example of FIG. 1, the first and second network devices 106-1 and 106-2 are intended to represent applicable devices for routing, at least in part, data traffic to and from a backend of a network. In various implementations, the first and second network devices 106-1 and 106-2 include a router, a switch, an access point, a gateway, including a wireless gateway, a repeater, or a combination thereof. In functioning as a gateway, the first and second network devices 106-1 and 106-2 can transport data from a backend of a network to devices coupled to the first and second network devices 106-1 and 106-2. In functioning as an access point, the first and second network devices 106-1 and 106-2 can couple devices coupled to the first and second network devices 106-1 and 106-2 to a network associated with the first and second network devices 106-1 and 106-2. In various implementations, the first and second network devices 106-1 and 106-2 function according to applicable protocols for forming part of a wireless network, including WiFi, such as the IEEE 802.11 standards.

In a specific implementation, the first and second network devices 106-1 and 106-2 function to authenticate or facilitate authentication of wireless devices coupled to them through a wireless network using unique pre-shared keys associated with the wireless devices. The first and second network devices 106-1 and 106-2 can directly authenticate wireless devices themselves or provide network access to network services including authentication of wireless devices remote from the first and second network devices 106-1 and 106-2, e.g. using a RADIUS server. In authenticating wireless devices using unique pre-shared keys, the wireless devices can gain access to network services associated with the unique pre-shared keys. For example, if network services associated with a unique pre-shared key include unlimited access to the Internet through a network, and the wireless device is authenticated using the unique pre-shared key, then the wireless device can gain unlimited access to the Internet through the network.

In a specific implementation, the first and second network devices 106-1 and 106-2 function to use key data stored locally at the first and second network devices 106-1 and 106-2 in authenticating wireless devices. Key data can include keys associated with wireless devices, MAC addresses of wireless devices bound to keys, and network service access rights associated with keys. In authenticating a wireless device using a unique pre-shared key, the first and second network devices 106-1 and 106-2 can query locally stored key data to determine if the unique pre-shared key is specifically associated with the wireless device, as indicated by the key data. For example, the first and second network devices 106-1 and 106-2 can determine if a unique pre-shared key used to create authentication data received from a wireless device is uniquely associated with the wireless device using key data stored locally at the first and second network devices 106-1 and 106-2. If the first and second network devices 106-1 and 106-2 determine from locally stored key data that the unique pre-shared key is specifically associated with a wireless device, then the first and second network devices 106-1 and 106-2 can directly authenticate the wireless device.

In a specific implementation, the first and second network devices 106-1 and 106-2 function to authenticate a wireless device to access a network at or through a wireless network according to cryptographic checksums. In authenticating a wireless device using a cryptographic checksum, the first and second first and second network devices 106-1 and 106-2 can query key data by selecting a unique pre-shared key as a candidate key and see if a validation cryptographic checksum using the candidate key matches a cryptographic checksum created provided from the wireless device using a unique pre-shared key. If the validation cryptographic checksum fails to match the cryptographic checksum provided from the wireless device, then the first and second network devices 106-1 and 106-2 can select another candidate key from key data and see if another validation cryptographic checksum created from the another candidate key matches the cryptographic checksum provided from the wireless device. This process can repeat until either all of the unique pre-shared keys stored as key data are exhausted or a validation cryptographic checksum is found to match the cryptographic checksum provided by the wireless device, after which the wireless device is authenticated.

In a specific implementation, the first and second network devices 106-1 and 106-2 function to authenticate a wireless device to access a network at or through a wireless network according to a 4-way handshake. In using a 4-way handshake to authenticate a wireless device, the first and second network devices 106-1 and 106-2 can send a first message including an A-nonce to a wireless device when it couples to or associates with the first and second network devices 106-1 and 106-2 through a wireless connection. An A-nonce can include a cryptographic nonce and/or a number used once.

In a specific implementations, as part of a 4-way handshake for authenticating a wireless device, the first and second network devices 106-1 and 106-2 function to receive a second message generated by the wireless device in response to providing of an A-nonce to the wireless device. In generating a second message for authentication, a wireless device can generates its own nonce, referred to as an S-Nonce. Additionally, using a generated S-Nonce and an A-Nonce, a wireless device can generate a copy of a pairwise transient key (hereinafter referred to as a "PTK"), which can be used to encrypt future communications with the first and second network devices 106-1 and 106-2. A PTK can be determined using a hash of an A-Nonce, S-Nonce, and other data, such as a pairwise master key (hereinafter referred to as a "PMK"). An example of a function to create a PTK is as follows, PTK=SHA1(PMK, wireless device MAC, network device MAC, A-Nonce, S-Nonce). A PMK can be generated from a unique pre-shared key assigned to a wireless device, e.g. according to the IEEE 802.11 family of network standards. In generating a second message, the wireless device can divide a PTK into four separate keys, each of which can be used for different purposes: EAPOL-MIC key, EAPOL-Encr key, Data-MIC key and Data-Encr key (for AES, the Data-MIC key and the Data_Encr key can be the same). A second message received by a wireless device by the first or second network devices 106-1 and 106-2 can include a generated S-Nonce and a MIC, which is a cryptographic checksum of the message. A MIC can be calculated by applying an EAPOL-MIC key, which is part of a PTK, to the other contents of a second message, including an S-Nonce.

In a specific implementation, as part of a 4-way handshake for authenticating a wireless device, the first or second network devices 106-1 and 106-2 function to identify a unique pre-shared key used by a wireless device to generate a received second message. In identifying a unique pre-shared key used to generate a second message as part of a 4-way handshake, the first or second network devices 106-1 and 106-2 can select one of a plurality of unique pre-shared keys from a set of unique pre-shared keys from key stored locally at the first or second network devices 106-1 and 106-2. Key data stored locally at the first or second network devices 106-1 and 106-2 can include a list of unique pre-shared keys assigned to wireless devices, or alternatively, a list of PMKs derived the unique pre-shared keys assigned to wireless devices.

In a specific implementation, as part of a 4-way handshake for authenticating a wireless device, the first and second network devices 106-1 and 106-2 function to determine a verification MIC for purposes of determining if a candidate key matches a unique pre-shared key used in generating a second message received from the wireless device. Upon receiving a second message from a wireless device including an S-Nonce and a MIC, the first or second network devices 106-1 and 106-2 can select one of a unique pre-shared keys or PMKs from locally stored key data. In various implementations, a selected key, whether in the form of a unique pre-shared key, a PMK, or other type of derived data, can be referred to as a candidate key. Using a candidate key, the first or second network devices 106-1 and 106-2 can derive a corresponding PTK. For example, the first or second network devices 106-1 and 106-2 can use a candidate key to derive a PTK in the same manner in which a wireless device derived a PTK. Additionally, the first or second network devices 106-1 and 106-2 can use all or a portion of a derived PTK to calculate its own MIC, e.g. a verification MIC.

In a specific implementation, as part of a 4-way handshake for authenticating a wireless device, the first and second network devices 106-1 and 106-2 function to compare a MIC with a MIC included in or derived from a second message received from a wireless device. If a verification MIC matches a MIC included in or derived from a second message from a wireless device, then the first and second network devices 106-1 and 106-2 can determine it has successfully identified the unique pre-shared key and corresponding PMK and PTK used by the wireless device, subsequently indicating a successful authentication. If it is determined a successful authentication of a wireless device, then the first and second network devices 106-1 and 106-2 can communicate with the client using a PTK derived from a selected unique pre-shared key or PMK, as indicated by key data stored locally. Conversely, if a verification MIC does not match a MIC included in or derived from a second message received from a wireless device, then the first and second network devices 106-1 and 106-2 can select another unique pre-shared key or PMK from locally stored key data, derives a new corresponding PTK and corresponding new verification MIC, and compare the new verification MIC with the MIC from the second message. The first and second network devices 106-1 and 106-2 can repeat derivation and comparing of new verification MICs until the verification MIC matches the MIC provided in or derived from a second message, indicating a successful authentication of a wireless device. Alternatively, if the first and second network devices 106-1 and 106-2 do not match a verification MIC with a MIC included in a second message based on locally stored key data, then authentication of a wireless device can fail.

In a specific implementation, as part of a 4-way handshake for authenticating a wireless device, the first and second network devices 106-1 and 106-2 function to exchange one or more additional messages with a wireless device to complete authentication. In exchanging messages to complete authentication as part of a 4-way handshake, the first and second network devices 106-1 and 106-2 can provide a group temporal key (hereinafter referred to as a "GTK") to be used for multicast traffic and a sequence number to a wireless device in a third message. Further, the first and second network devices 106-1 and 106-2 can receive a fourth message from a wireless device acknowledging completion of authentication of the wireless device. The first and second network devices 106-1 and 106-2 can then communicate with a wireless device using a PTK and a GTK.

In a specific implementation, the first and second network devices 106-1 and 106-2 function to pre-calculate and store locally PMKs from pre-shared keys locally stored as key data before wireless devices attempt to authenticate at the first and second network devices 106-1 and 106-2. As a result, time required to determine and compare a large number of verification MICs with a MIC received in or derived from a second message received from a wireless device is reduced. This can reduce times for authenticating wireless devices at the first and second network devices 106-1 and 106-2 and also can reduce computation resources utilized by the first and second network devices 106-1 and 106-2 in authenticating wireless devices.

In a specific implementation, the first and second network devices 106-1 and 106-2 function to facilitate transmission of data for purposes of authentication of wireless devices using a 4-way handshake remote from the first and second network devices 106-1 and 106-2. For example, the first and second network devices 106-1 and 106-2 can transport data to and from a RADIUS server maintained remote from the first and second network devices 106-1 and 106-2 for purposes of authenticating a wireless device using a unique pre-shared key according to a 4-way handshake. The first and second network devices 106-1 and 106-2 can facilitate transmission of data to a remote location for purposes of authentication a wireless device at a remote location according to methods of authentication through a 4-way handshake described in this paper. For example, the first and second network devices 106-1 and 106-2 can transmit data to a RADIUS server sent to the first and second network devices 106-1 and 106-2 as part of a second message received from a wireless device in authenticating at or through a wireless network.

In a specific implementation, the first and second network devices 106-1 and 106-2 function to transmit to a RADIUS server data used to derive a unique pre-shared key. The first and second network devices 106-1 and 106-2 can transmit data to a RADIUS server including a username and password and other data for use in authenticating a wireless device. For example the first and second network devices 106-1 and 106-2 can transmit: <PSK>=<password>, or <PSK>=<username><concatenating string><password>. For example, when username="adam" and password="abc123" are provided, and if the expression <PSK>=<password> is chosen, the PSK will be "abc123"; if the expression <PSK>=<username><concatenating string><password> is chosen and the <concatenating string>="#", the PSK will be "adam#abc123".

In a specific implementation, a username is configured for an individual user and transmitted to a wireless device of the user through the first and second network devices 106-1 and 106-2. A "createdtime" is the time when the password is created and is starting to be used for authentication. An "expired-time" is the time when a password ceases to be valid. An "index" is an index of passwords used to specify one user and to distinguish different users (e.g. different users will be given different indexes). Indexes can be used to generate a large numbers of passwords (to derive a plurality of pre-shared keys) for guest clients. The "secret" can be a shared secret among all wireless access points for generating the same password for the same user. The "location" can be used to distinguish the HQ and branches for large companies. The "SSID" is the SSID the pre-shared keys will apply to. Some or all of these parameters of this example may be optional, for example allowing the SSID and/or index to be omitted.

In a specific implementation, a wireless device can authenticate at or through the first and second network devices 106-1 and 106-2 using a unique pre-shared key and/or a username of a user of the wireless device. For example, the first and second network devices 106-1 and 106-2 can use a unique pre-shared key associated with a username of a user of a wireless device, as indicated by key data to authenticate the wireless device. In another example, a wireless device can be authenticated at location remote from the first and second network devices 106-1 and 106-2, e.g. a RADIUS server. For example a RADIUS server can use a unique pre-shared key associated with a username of a user of a wireless device, as indicated by key data to authenticate the wireless device. In various implementations, a wireless device can be authenticated using a username and/or a password to determine a unique pre-shared key associated with a wireless device and subsequently authenticate the wireless device using the unique pre-shared key.

In the example of FIG. 1, the unique pre-shared key assignment system 108 is intended to represent an applicable system for assigning a unique pre-shared key to a wireless device for purposes of onboarding the wireless device to access a network at or through a wireless network using the unique pre-shared key. In assigning a unique pre-shared key to a wireless device, the wireless device can gain access to network services associated with the unique pre-shared key through authentication of the wireless device using the unique pre-shared key. The unique pre-shared key assignment system 108 can assign a unique pre-shared key to a wireless device when the wireless device establishes a wireless connection with a network device through a wireless network. Further, the unique pre-shared key assignment system 108 can assign a unique pre-shared key to a wireless device for purposes of onboarding the wireless device for a network at or through a network device using a wireless network. For example, the unique pre-shared key assignment system 108 can assign a unique pre-shared key to a wireless device for onboarding the wireless device over a wireless connection established between the wireless device through a network device and the wireless device using a wireless connection.

In a specific implementation, the unique pre-shared key assignment system 108 functions to assign a unique pre-shared key to a user for purposes of authenticating wireless devices of the user to access a network. As a result, a user can authenticate different wireless devices using the same unique pre-shared key. Further, in assigning a unique pre-shared key to a user, the user can gain access to a network simultaneously with multiple wireless devices. In various implementations, a unique pre-shared key associated with a user can be used along with a username and/or password of the user to authenticate a wireless device of the user. In assigning a unique pre-shared key, the unique pre-shared key assignment system 108 can set a connection limit for the unique pre-shared key. A connection limit can specify a number of devices that can access a network using a unique pre-shared key simultaneously.

In a specific implementation, the unique pre-shared key assignment system 108 functions to onboard a device using a unique pre-shared key assigned to the device. The unique pre-shared key assignment system 108 can onboard a device using a common key and a unique pre-shared key assigned to the device. The unique pre-shared key assignment system 108 can onboard a wireless device as part of network services accessed at or through a wireless connection established on premises between a network device and the wireless device based on authentication of the wireless device using a common key, e.g. a public pre-shared key. For example, the unique pre-shared key assignment system 108 can send a unique pre-shared key to a wireless device and potentially configure the wireless device to authenticate using the unique pre-shared key over a wireless connection established when a wireless device is brought on premises. Alternatively, the unique pre-shared key assignment system 108 can onboard a wireless device using a unique pre-shared key assigned to the device when the device is located off premises, e.g. when the wireless device is decoupled from an enterprise network associated with the unique pre-shared key or a wireless network used to access the enterprise network. For example, the unique pre-shared key assignment system 108 can send a unique pre-shared key to an email account of a user of a wireless device, through which the user can download the unique pre-shared key to the wireless device when it is off premises. In another example, the unique pre-shared key assignment system 108 can send a unique pre-shared key to an application executing at a wireless device or accessed by the wireless device over a network separate from an enterprise network associated with the unique pre-shared key.

In a specific implementation, the unique pre-shared key assignment system 108 is implemented, at least in part, through an application executing at a wireless device. The unique pre-shared key assignment system 108 can be implemented through an enterprise application at a wireless device. An application implementing the unique pre-shared key assignment system 108 at a wireless device can receive a unique pre-shared key and/or a configuration profile at the wireless device. A configuration profile specifies how to configure a wireless device to authenticate using a unique pre-shared key. An application implementing the unique pre-shared key assignment system 108 at a wireless device can receive a unique pre-shared key and/or a configuration profile at the wireless device when a wireless device is coupled to the wireless networks 112 and 114 whereat or where through the unique pre-shared key is used for network authentication. Additionally, an application implementing the unique pre-shared key assignment system 108 at a wireless device can gather and send identification information at the wireless device for purposes of network authentication using a unique pre-shared key. Identification information includes applicable information for identifying a device or a person, profile, or account with which the device is associated. For example, identification information can include a MAC address of a device and user credentials of a person attempting network authentication with a device. In another example, identification information can include a username and/or password of a user of a wireless device.

In various implementations, the unique pre-shared key assignment system 108 can assign a unique pre-shared key to each of wireless device so each wireless device has its own unique pre-shared key. In a specific implementation, the unique pre-shared key assignment system 108 can associate unique pre-shared keys with specific network service access rights. For example, the unique pre-shared key assignment system 108 can associate with a unique pre-shared key assigned to a wireless device associated with a student, access rights specifying to only allow access to a school's intranet. In another example, the unique pre-shared key assignment system 108 can associate with a unique pre-shared key assigned to a wireless device associated with a network administrator, unlimited access rights to network services of a network. The unique pre-shared key assignment system 108 can associate a unique pre-shared key with specific network service access rights based on input for a network administrator. Additionally, the unique pre-shared key assignment system 108 can associate a unique pre-shared key with specific network service access rights based on user personas of users of wireless devices. For example, if a user persona indicates a user is within a specific group of users, and the specific group of users traditionally access specific network services, then the unique pre-shared key assignment system 108 can associate network service access rights indicating to access the specific network services with a unique pre-shared key assigned to a wireless device of the user.

In a specific implementation, the unique pre-shared key assignment system 108 functions to bind identities of assignments with unique pre-shared keys. Identities bound to unique pre-shared keys by the unique pre-shared key assignment system 108 can include identities of wireless devices and/or users of wireless devices associated with unique pre-shared keys. For example, the unique pre-shared key assignment system 108 can bind a MAC address of a wireless device assigned to a unique pre-shared key with the unique pre-shared key. In another example, the unique pre-shared key assignment system 108 can bind an identity of a user or a username of a user assigned to a unique pre-shared key with the unique pre-shared key.

In a specific implementation, the unique pre-shared key assignment system 108 maintains key data. Key data can include specific keys, e.g. unique pre-shared keys, assigned to users and wireless devices, identities of wireless devices and users, network service access rights associated with keys, identities bound to keys, and usernames and passwords of users.

In a specific implementation, the unique pre-shared key assignment system 108 configures a device to access a network using a unique pre-shared key as part of onboarding the device. In a specific implementation, the unique pre-shared key assignment system 108 configures a device based on a configuration profile. For example, if a configuration profile indicates to configure a device according to specific values of configuration parameters, then the unique pre-shared key assignment system 108 can configure the device for network authentication using the specific values. The unique pre-shared key assignment system 108 can configure a wireless device using a unique pre-shared key provided to the wireless device. For example, the unique pre-shared key assignment system 108 can include an application on a wireless device configured to authenticate at or through the wireless networks 112 or 114 via an applicable API.

In a specific implementation, the unique pre-shared key assignment system 108 functions to determine identities of wireless devices and/or users. The unique pre-shared key assignment system 108 can determine identities for purposes of binding the identities to unique pre-shared keys. The unique pre-shared key assignment system 108 can identify identities based on authentication data received from a device during network authentication using a common key. Additionally, the unique pre-shared key assignment system 108 can identify identities through an application at the device. For example, the unique pre-shared key assignment system 108 can be implemented as an application at a wireless device and use an API to access device information to determine a MAC address of the wireless device.

In a specific implementation, the unique pre-shared key assignment system 108 functions to map users and wireless devices intro network groups according to network personas. A network group can include a single or multiple users and wireless devices. A network group is defined by network personas. For example, a network group can include users or wireless devices who share a same network persona or personas or users or wireless devices that have associated network persona or personas. Network personas include characteristics of users and wireless devices. For example, network personas can include device types of wireless devices, operational parameters and characteristics of wireless devices, and network services wireless devices are capable of exploiting. In another example, network personas can include user identifications, user types, and user roles or affiliations with an enterprise network. In yet another example, network persona can include whether a user has gained the right to be authenticated locally at a network device as opposed to be authenticated remotely. Network personas can include values of market segmentation variables used to map users and wireless devices into network groups. Market segmentation variables include demographic, geographic, psychographic, behavioristic variables. For example, values of market segmentation variables can segment a user into a network group defined by an age of a user. In another example, values of market segmentation variables can segment a wireless device into a network group defined by a device type of the wireless device. In determining network personas of users and wireless devices, the unique pre-shared key assignment system 108 can maintain network group data indicating network groups users and wireless devices are mapped to according to network personas.

In a specific implementation, the unique pre-shared key assignment system 108 functions to divide wireless devices and/or users into different characteristic-based sections. A characteristic-based section can be associated with one or more group attributes, such as a VLAN ID, user profile ID(user role) and firewall policy. Characteristic-based sections can be used identified and used for purposes of authenticating wireless devices for a network. This allows different wireless devices or groups of wireless devices to be treated differently upon connection with a network, for example using different VLANs, different user profiles, and different firewall policies.

In the example of FIG. 1, the network device selective synchronization system 110 is intended to represent an applicable system for selectively synchronizing network devices with data for purposes of authenticating wireless devices to access a network. The network device selective synchronization system 110 can provide data, as part of selective synchronization, to network devices, which the network devices can use to directly authenticate wireless devices at the network devices. For example, the network device selective synchronization system 110 can provide key data to network devices, which the network devices can use to authenticate wireless devices, e.g. using a 4-way handshake. The synchronization performed by the network device selective synchronization system 110 is selective in that different network devices can receive different data for purposes of authenticating wireless devices instead of synchronizing all network devices to receive all data for authenticating wireless devices for a network. For example, a first network device can be sent a first subset of unique pre-shared keys, while a second network device can be sent a second subset of unique pre-shared keys different from the first subset of unique pre-shared keys. In selectively synchronizing network devices, storage space required at network devices for data used in authenticating wireless devices is increased. Additionally, in selectively synchronizing network devices, computation resource usage at the network devices is decreased as network devices do not need to parse through as much key data for authentication purposes as opposed to when network devices are synchronized with all key data for an enterprise network.

In selectively synchronizing network devices, the network device selective synchronization system 110 can select specific network devices to synchronize with data for purposes of authenticating wireless devices. The network device selective synchronization system 110 can select specific network devices to synchronize based on network device characteristics data. For example, the network device selective synchronization system 110 can select a specific network device to synchronize with data used in authentication of wireless devices based on network device characteristics data indicating a location of the specific network device. Further, in selectively synchronizing network devices, the network device selective synchronization system 110 can select specific data used in authentication of wireless devices to provide to a network device. The network device selective synchronization system 110 can select specific data used in authentication of wireless devices to send to a network device based on network groups to which users and wireless devices have been mapped according to network personas.

In a specific implementation, the network device selective synchronization system 110 functions to maintain network device characteristics data of network devices. Network device characteristics data can include applicable data for describing characteristics of network devices in providing access to a network. Network device characteristics data can indicate a location of a network device, a storage capacity at a network device, a device type of a network device, devices a network device is configured to operate with, groups a network device provides network access for, and network administrators associated with a network device. The network device selective synchronization system 110 can maintain network device characteristics data based on data received from a network device. For example, data received from a network device can indicate the network device is at a specific location and the network device selective synchronization system 110 can update network device characteristics data to indicate the network device is at the specific location.

In a specific implementation, the network device selective synchronization system 110 functions to selectively synchronize network devices according to synchronization policies. Synchronization policies include rules for selectively synchronizing network devices to authenticate wireless devices for a network. Synchronization policies can indicate which key data to send to specific network devices based on network device characteristics and/or network groups to which wireless devices and users can be mapped. For example, synchronization policies can specify sending key data of devices mapped to a network group of guest devices of an enterprise network to network devices within wireless range of guest offices at a physical location. In another example, synchronization policies can specify sending key data of wireless devices utilized by users mapped to a specific group within an organization to network devices located in wireless range of offices occupied by the specific group within the organization. Synchronization policies can also specify an expiration time for data sent to network devices for use in authenticating wireless devices.

In a specific implementation, the network device selective synchronization system 110 functions to maintain synchronization policies, as indicated by synchronization policy data. In maintaining synchronization policies the network device selective synchronization system 110 can generate and/or update synchronization policies. The network device selective synchronization system 110 can maintain synchronization policies according to input received from a network administrator. For example, a network administrator can input that devices of a specific type should be able to access all network devices on a floor, and the network device selective synchronization system 110 can update synchronization policies to indicate sending key data for devices of the specific type to the network devices on the specific floor. Additionally, the network device selective synchronization system 110 can maintain synchronization policies according to network access patterns and/or network service behavior. For example, if users with a specific group access a network through network devices at specific locations, then the network device selective synchronization system 110 can update synchronization policies to indicate sending key data for devices utilized by users in the specific group to network devices at the specific locations.

In a specific implementation, the network device selective synchronization system 110 functions to set expiration times for data sent to network devices for use in authentication. Expiration times can specify a time period to keep key data in local storage at a network device. A network device can remove key data from local storage after an expiration time has expired. As a result, local storage does not become burdened with old key data and can be selectively synchronized with new key data. The network device selective synchronization system 110 can set expiration times for key data based on synchronization policies. For example, if synchronization policies specify that a unique pre-shared key of a guest to an enterprise network expires after twelve hours, then the network device selective synchronization system 110 can set an expiration time for key data associated with guests at twelve hours.

In a specific implementation, the network device selective synchronization system 110 can selectively synchronize network devices after receiving instructions to selectively synchronize from a network administrator. For example, if a network administrator indicates to selectively synchronize network devices on a first floor of a building with data for device authentication, then the network device selective synchronization system 110 can selectively synchronize the network devices on the first floor. In a specific implementation, the network device selective synchronization system 110 can selectively synchronize network devices after a specific number of devices have been assigned unique pre-shared keys as part of onboarding. For example, if one thousand wireless devices are onboarded using a unique pre-shared key, then the network device selective synchronization system 110 can selectively synchronize network devices to authenticate the wireless devices.

In an example of operation of the example system shown in FIG. 1, the unique pre-shared key assignment system 108 assigns a first unique pre-shared key to the first wireless device 104-1 and a second unique pre-shared key to the second wireless device 104-2. In the example of operation of the example system shown in FIG. 1, the unique pre-shared key assignment system 108 updates first key data to indicate that the first unique pre-shared key is assigned to the first wireless device 104-1 and updates second key data to indicate that the second unique pre-shared key is assigned to the second wireless device 104-2. Further, in the example of operation of the example system shown in FIG. 1, the network device selective synchronization system 110 send the first key data to the first network device 106-1 and refrains from sending the first key data to the second network device 106-2 as part of selective synchronization according to synchronization policies. In the example of operation of the example system shown in FIG. 1, the network device selective synchronization system 110 send the second key data to the second network device 106-2 and refrains from sending the second key data to the first network device 106-1 as part of selective synchronization according to synchronization policies. Additionally, in the example of operation of the example system shown in FIG. 1, the first network device 106-1 authenticates the first wireless device 104-1 to access a network through the first wireless network 112 using the first key data. Further, in the example of operation of the example system shown in FIG. 1, the second network device 106-2 authenticates the second wireless device 104-2 to access the network through the second wireless network 114 using the second key data.

Figure 2:
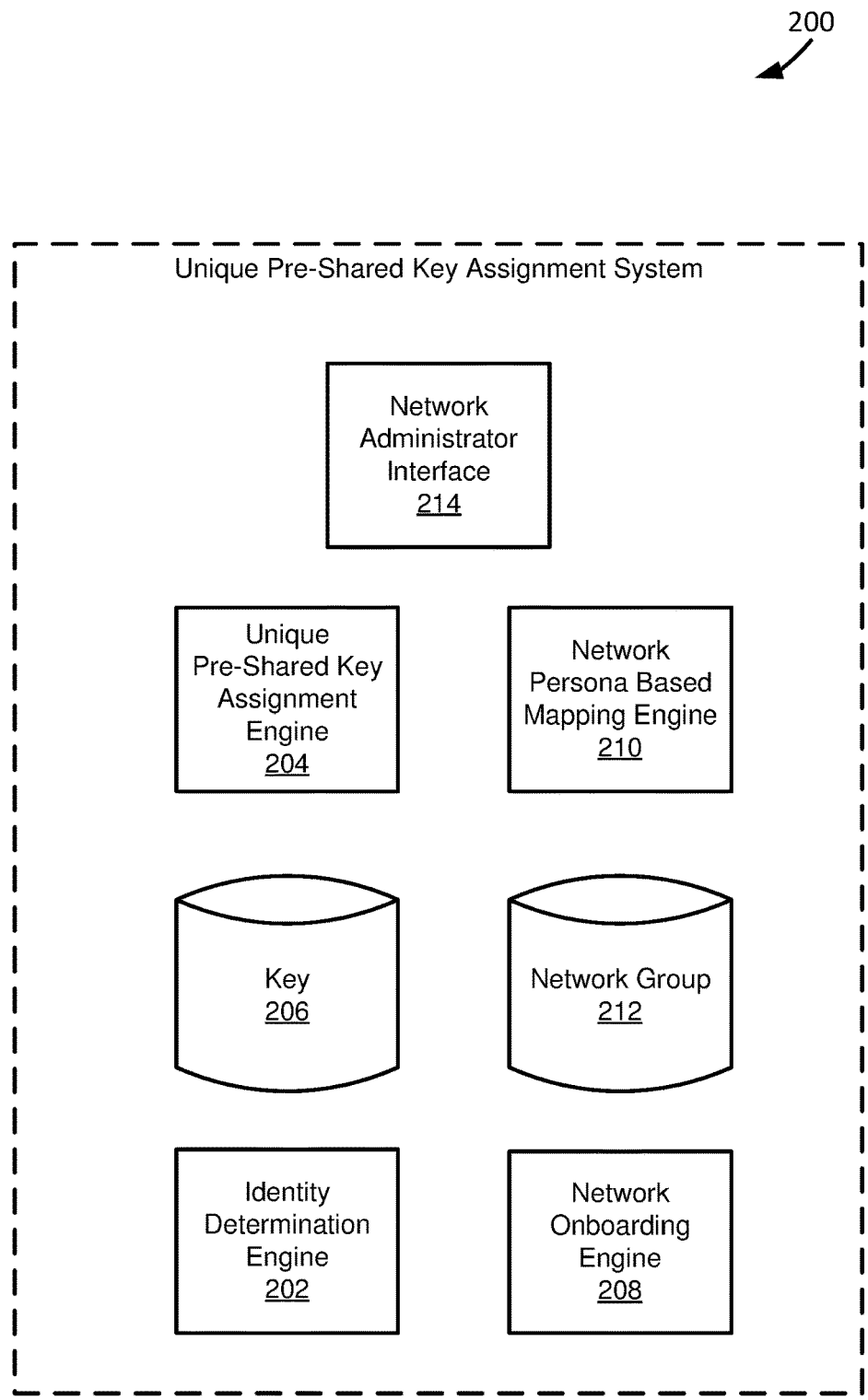
FIG. 2 depicts a diagram of an example of a unique pre-shared key assignment system 202.

FIG. 2 depicts a diagram 200 of an example of a unique pre-shared key assignment system. The unique pre-shared key assignment system functions according to an applicable system for assigning unique pre-shared keys to wireless devices for purposes of authenticating the wireless device for a network, such as the unique pre-shared key assignment systems described in this paper. The unique pre-shared key assignment system can determine and bind identities of unique pre-shared key assignments to unique pre-shared keys. For example, the unique pre-shared key assignment system can determine a MAC address of a wireless device and bind a unique pre-shared key assigned to the wireless device to the MAC address. The unique pre-shared key assignment system can onboard a wireless device to access a network using a unique pre-shared key. As part of onboarding a wireless device, the unique pre-shared key assignment system can send a unique pre-shared key to the wireless device and potentially configure the wireless device to authenticate using the unique pre-shared key.

The unique pre-shared key assignment system functions to map a user or wireless device to a network group based on network personas. For example, the unique pre-shared key assignment system can map a user into a network group of other users who are the same age as the user. In another example, the unique pre-shared key assignment system can map a wireless device into a network group of wireless devices that share a same device type as the wireless device. The unique pre-shared key assignment system can map a user or wireless device to a network group based on input received from a network administrator. For example, if a network administrator indicates a plurality of a wireless devices belong to users who are students, then, the unique pre-shared key assignment system can map the users and wireless devices into a network group of students.

The unique pre-shared key assignment system includes an identity determination engine 202, a unique pre-shared key assignment engine 204, a key datastore 206, a network onboarding engine 208, a network persona based mapping engine 210, and a network administrator interface 214. The identity determination engine 202 functions to determine identities of assignments of unique pre-shared keys. Identities of assignments determined by the identity determination engine 202 can be bound to assigned unique pre-shared keys. For example, a MAC address of a wireless device, as determined by the identity determination engine 202, can be bound to a unique pre-shared key assigned to the wireless device. In another example, an identity of a user, e.g. a username can be bound to a unique pre-shared key assigned to the user or a wireless device associated with the user. In binding an identity of an assignment of a unique pre-shared key to the unique pre-shared key, network security can be enforced. Specifically, a binding of an identity to a unique pre-shared key can be used to determine if a wireless device is trying to use unique pre-shared key they are not authorized to user.

In the example of FIG. 2, the identity determination engine 202 is intended to represent an applicable engine to determine identities of assignment of unique pre-shared keys through authentication of a wireless device to access a network. The identity determination engine 202 can determine a MAC address of a wireless device and/or a username of a user utilizing the wireless device from authentication data received from the wireless device for purposes of authenticating the wireless device for a network.

In the example of FIG. 2, the unique pre-shared key assignment engine 204 is intended to represent an applicable engine to assign a unique pre-shared key to wireless devices and/or users of wireless devices. The unique pre-shared key assignment engine 204 can assign a plurality of wireless devices different unique pre-shared keys such that each unique pre-shared key is only used by a single wireless device in authentication. The unique pre-shared key assignment engine 204 can assign a unique pre-shared key to a wireless device seamlessly without being instructed to do so by a network administrator. Further the unique pre-shared key assignment engine 204 can set a connection limit for a unique pre-shared key it assigns.

In a specific implementation, the unique pre-shared key assignment engine 204 functions to bind an identity of an assignment of a unique pre-shared key to the unique pre-shared key. In binding an identity of an assignment of a unique pre-shared key to the unique pre-shared key, security of a network and/or wireless network can be managed. For example, if a wireless device with a MAC address different from a MAC address bound to a unique pre-shared key attempts to authenticate to access network services using the unique pre-shared key, then it can be determined that the unique pre-shared key is compromised, and appropriate actions can subsequently be taken.

In a specific implementation, the unique pre-shared key assignment engine 204 functions to disassociate a wireless device or a user from a unique pre-shared key assigned to the wireless device or the user. The unique pre-shared key assignment engine 204 can disassociate a unique pre-shared key from an assigned wireless device or user if the unique pre-shared key is used by another wireless device or user to authenticate. Alternatively, the unique pre-shared key assignment engine 204 can disassociate a unique pre-shared key from a wireless device or a user based on instructions received from a network administrator. In response to disassociating a unique pre-shared key from a wireless device or user, the unique pre-shared key assignment engine 204 can associate the wireless device or user with a new unique pre-shared key after disassociating the wireless device or user from the old unique pre-shared key.

In a specific implementation, the unique pre-shared key assignment engine 204 functions to generate a configuration profile for use in configuring a wireless device to authenticate using a unique pre-shared key. The unique pre-shared key assignment engine 204 can generate a configuration profile based on characteristics of a wireless device, characteristics of a user of a wireless device, characteristics of a wireless network used by a wireless device to access a network using the unique pre-shared key, and/or network service access associated with a unique pre-shared key assigned to a wireless device. Additionally, the unique pre-shared key assignment engine 204 can generate a configuration profile based on input received from a network administrator. For example, if a network administrator indicates all wireless devices of a specific type should be configured according to a specific configuration parameter, then the unique pre-shared key assignment engine 204 can generate a configuration profile including the specific configuration parameter for a wireless device of the specific type.

In a specific implementation, the unique pre-shared key assignment engine 204 functions to manage key data. In managing key data, the unique pre-shared key assignment engine 204 can generate or update key data to indicate users and wireless devices assigned to specific unique pre-shared keys. The unique pre-shared key assignment engine 204 can manage key data to indicate network service access rights associated with specific keys. The unique pre-shared key assignment engine 204 can manage key data to indicate network service access rights based on input received from a network administrator. For example, if a network administrator indicates that authentication with a specific unique pre-shared key only allows access to network services provided by an enterprise network, then the key data management engine 308 can update key data to indicate network service access rights associated with the specific pre-shared key include enterprise network access.

In the example of FIG. 2, the key datastore 206 is intended to represent an applicable datastore to store key data. Key data stored in the key datastore 206 can be used to authenticate wireless devices to access a network. Key data stored in the key datastore 206 can be sent to network devices for local storage according to selective synchronization of the network devices.

In the example of FIG. 2, the network onboarding engine 208 is intended to represent an applicable engine to onboard a wireless device to access a network using a unique pre-shared key. In onboarding a wireless device to access a network using a unique pre-shared key, the network onboarding engine 208 can provide the unique pre-shared key to the wireless device. The network onboarding engine 208 can provide a portal through which a user of a wireless device can access and/or download a unique pre-shared key as part of onboarding the wireless device. For example, the network onboarding engine 208 can provide a portal that a user can access through a web browser executing at a wireless device and subsequently download or view a unique pre-shared key assigned to the wireless device. Alternatively, the network onboarding engine 208 can provide a unique pre-shared key to a wireless device through a messaging service. For example, the network onboarding engine 208 can email a unique pre-shared key to a user of a wireless device.

In a specific implementation, the network onboarding engine 208 functions to communicate with a wireless device for purposes of onboarding a wireless device to access a network through a wireless network using a unique pre-shared key when the wireless device is decoupled from the wireless network. For example, the network onboarding engine 208 can provide a web-based portal through which a user can download a unique pre-shared key when a wireless device is decoupled from a wireless network through which the wireless device can access a network. In another example, the network onboarding engine 208 can send a unique pre-shared key to a wireless device when the wireless device is coupled to a second network different from a wireless network through which the wireless device can access a network.

In a specific implementation, the network onboarding engine 208 functions to provide a configuration profile to a wireless device for purposes of onboarding the wireless device to access a network using a unique pre-shared key. The network onboarding engine 208 can send a configuration profile to a wireless device or provide a portal through which a user of the wireless device can access and/or download a configuration profile. Alternatively, the network onboarding engine 208 can directly provide a configuration profile to a wireless device for purposes of onboarding the wireless device to access a network through a wireless network.

In a specific implementation, the network onboarding engine 208 functions to configure a wireless device to authenticate using a unique pre-shared key. In configuring a wireless device to authenticate, the network onboarding engine 208 can configure the wireless device using a unique pre-shared key assigned to the wireless device and/or a configuration profile generated for the wireless device. The network onboarding engine 208 can be implemented, at least in part, through an application executing at a wireless device and organized to configure the wireless device to authenticate using a unique pre-shared key. Additionally, the network onboarding engine 208 can function to instruct or control an applicable application for configuring a wireless device to authenticate for a network to configure the wireless device to authenticate using a unique pre-shared key. For example, the network onboarding engine 208 can instruct an application through an API to configure a wireless device to authenticate using a unique pre-shared key.

In the example of FIG. 2, the network persona based mapping engine 210 is intended to represent an applicable engine to map a wireless device or a user to a network group based on network personas. The network persona based mapping engine 210 can map a wireless device or a user to a network group for purposes of selectively synchronizing network devices to authenticate wireless devices to access a network at or through a wireless network provided through the network devices. In mapping wireless devices or users to network groups, the network persona based mapping engine 210 can determine network personas of the wireless devices or users. For example, the network persona based mapping engine 210 can determine that a user is part of a group within an entity and subsequently map the user to a network group including other users within the group in the entity. In another example, the network persona based mapping engine 210 can determine that a wireless device is of a specific type and map the wireless device to a network group including wireless devise of the specific type.

In a specific implementation, the network persona based mapping engine 210 functions to map wireless devices or users to network groups using network personas based on input received from a network administrator. For example if input from a network administrator indicates a user is associated with a specific group within a company, then the network persona based mapping engine 210 can map the user to a network group including users with the specific group within the company. In a specific implementation, the network persona based mapping engine 210 functions to map wireless devices or users to network groups according to network behaviors of the wireless devices or the users. For example, if a wireless device frequently forms a wireless connection with network devices at a specific location of a group within an entity, then the network persona based mapping engine 210 can map the wireless device to a network group including other users in the group within the entity.

In the example of FIG. 2, the network group datastore 212 is intended to represent an applicable datastore to store network group data. Network group data can indicate network groups to which a user or wireless device has been mapped based on network personas.

In the example of FIG. 2, the network administrator interface 214 is intended to represent an applicable interface through which a network administrator can communicate with the unique pre-shared key assignment system 202. Through the network administrator interface 214, a network administrator can provide input regarding onboarding of wireless devices. For example, through the network administrator interface 214, a network administrator can provide instructions to onboard specific wireless devices. Additionally, through the network administrator interface 214, a network administrator can provide input used to map a wireless device or a user to a network group. For example, through the network administrator interface 214, a network administrator can provide input indicating network personas of a user.

In an example of operation of the example system shown in FIG. 2, the identity determination engine 202 functions to determine an identity of a wireless device. In the example of operation of the example system shown in FIG. 2, the unique pre-shared key assignment engine assigns a unique pre-shared key to the wireless device and updates key data stored in the key datastore 206 to indicate the unique pre-shared key is assigned to the wireless device. Additionally, in the example of operation of the example system shown in FIG. 2, the unique pre-shared key assignment engine 204 binds the identity of the wireless device determined by the identity determination engine 202 to the unique pre-shared key. In the example of operation of the example system shown in FIG. 2, the network onboarding engine 208 onboards the wireless device to access a network using the unique pre-shared key. Further, in the example of operation of the example system shown in FIG. 2, the network persona based mapping engine maps the wireless device to a network group based on network personas of the wireless device. In the example of operation of the example system shown in FIG. 2, the network persona based mapping engine 210 updates network group data stored in the network group datastore 212 to indicate the network group to which the wireless device is mapped.

Figure 3:
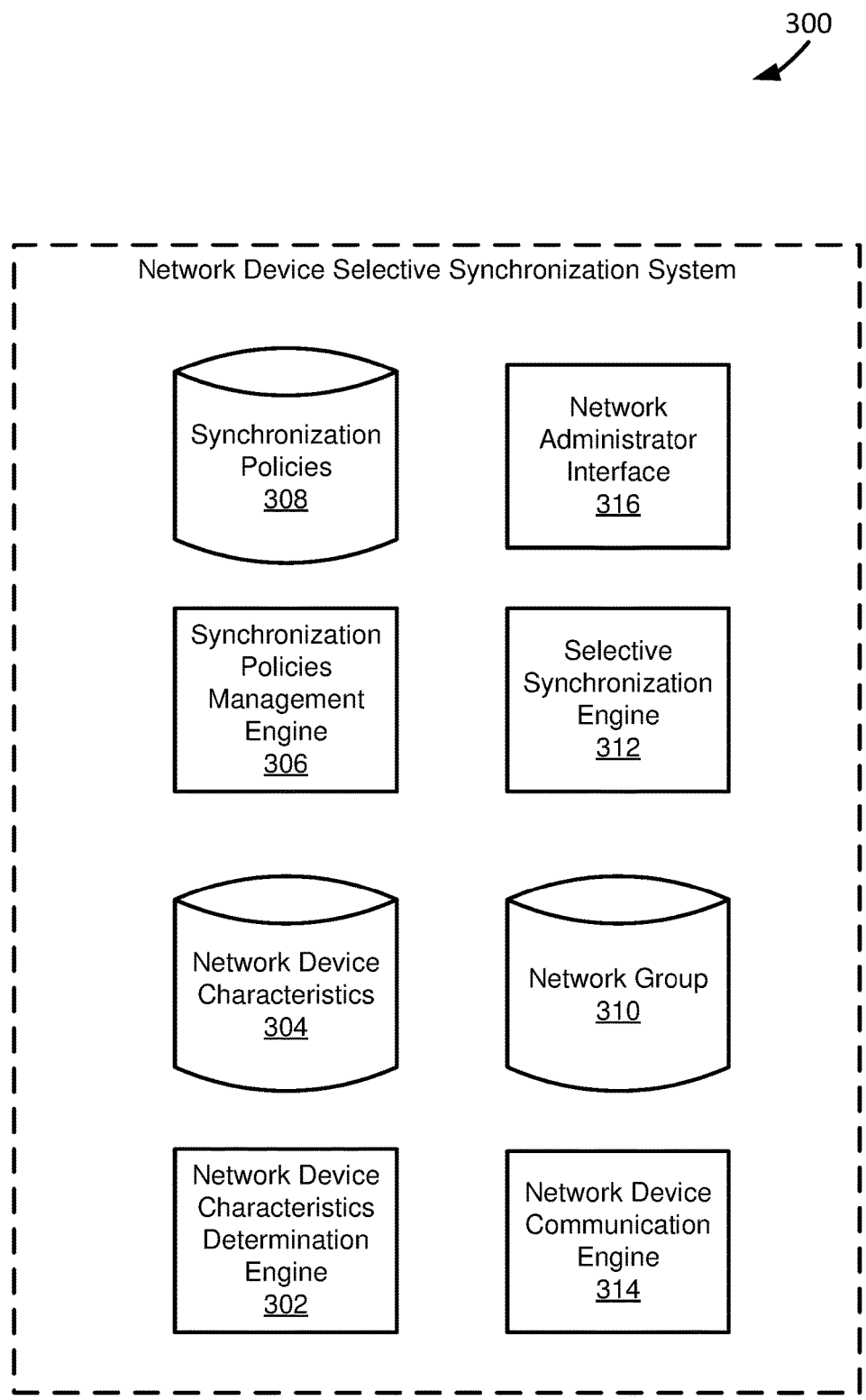
FIG. 3 depicts a diagram of an example network device selective synchronization system.

FIG. 3 depicts a diagram 300 of an example network device selective synchronization system. The network device selective synchronization system functions according to an applicable system for selectively synchronizing network devices to authenticate wireless devices for a network, such as the network device selective synchronization systems described in this paper. In selectively synchronizing network devices, the network device selective synchronization system can selectively provide key data to network devices for use in authenticating wireless device for a network. The network device selective synchronization system can synchronize network devices according to network groups to which users and wireless devices are mapped. For example, if a wireless device is mapped to a network group of a group within a company, then the network device selective synchronization system can selectively synchronize network devices at the physical location of the group within the company with key data of the wireless device. Additionally, the network device selective synchronization system can synchronize network devices according to synchronization policies.

The network device selective synchronization system includes a network device characteristics determination engine 302, a network device characteristics datastore 304, a synchronization policies management engine 306, a synchronization policies datastore 308, a network group datastore 310, a selective synchronization engine 312, a network device communication engine 314, and a network administrator interface 316. The network device characteristics determination engine 302 functions to determine network device characteristics of network devices for purposes of selectively synchronizing the network devices. The network device characteristics determination engine 314 can maintain network device characteristics data indicating determined network device characteristics. The network device characteristics determination engine 302 can determine characteristics of a network device based on operation of a network device in providing access to a network. For example, the network device characteristics determination engine 302 can determine a group within an organization to which a network device provides access based on data transmitted to and from the network device. Additionally, the network device characteristics determination engine 302 can determine characteristics of a network device based on input received from a network administrator. For example, input received from a network administrator can indicate a physical location of a network device in providing access to a network.

In the example of FIG. 3, the network device characteristics datastore 304 is intended to represent an applicable datastore to store network device characteristics data indicating characteristics of network devices. Network device characteristics data stored in the network device characteristics datastore 304 can be used to selectively synchronize network devices to authenticate wireless devices. For example, based on a physical location of a network device, as indicated by network device characteristics data stored in the network device characteristics datastore 304, can be used to select the network device and selectively synchronize the network device with key data for purposes of device authentication.

In the example of FIG. 3, the synchronization policies management engine 306 is intended to represent an applicable engine to maintain synchronization policies for selectively synchronizing network devices. In maintaining synchronization policies, the synchronization policies management engine 306 can generate and/or modify synchronization policies, as indicated by synchronization policies data. The synchronization policies management engine 306 can generate synchronization policies for specific network groups to which users and wireless devices can be mapped. For example, the synchronization policies management engine 306 can generate a synchronization policy specifying that key data of devices should be sent to network devices in wireless range of guest offices at an office for devices mapped to a network group of guests of an enterprise network. In another example, the synchronization policies management engine 306 can generate a synchronization policy specifying to send key data of devices of users mapped to a network group of network administrators to all network devices on premises managed by the network administrators.

In a specific implementation, the synchronization policies management engine 306 functions to maintain synchronization policies including expiration times of data sent to network devices. For example, the synchronization policies management engine 306 can include in a synchronization policy of sending key data of devices mapped to a specific network group to a specific network device an expiration time of two weeks. Network devices can subsequently delete key data according to expiration times of the key data.

In a specific implementation, the synchronization policies management engine 306 functions to maintain synchronization policies according to input received from a network administrator. For example, if input is received from a network administrator indicating that all users within a specific group should have key data of their wireless devices sent to all network devices, then the synchronization policies management engine 306 can generate a synchronization policy of sending key data of wireless devices of users mapped to the specific group to all network devices. In a specific implementation, the synchronization policies management engine 306 functions to maintain synchronization policies according to network access patterns and/or network service behavior. For example, if wireless devices mapped to a specific group continuously authenticate at or through a specific network device, then the synchronization policies management engine 306 can generate a synchronization policy of sending key data of wireless devices mapped to the specific group to the specific network device.

In the example of FIG. 3, the synchronization policies datastore 308 is intended to represent an applicable datastore to store synchronization policies data indicating synchronization polices. Synchronization policies data stored in the synchronization policies datastore 308 can be used to selectively synchronize network devices to authenticate wireless devices for a network.

In the example of FIG. 3, the network group datastore 310 is intended to represent an applicable datastore for storing network group data, such as the network group datastores described in this paper. Network group data stored in the network group datastore 310 indicates network groups to which users and wireless devices have been mapped based on network personas.

In the example of FIG. 3, the selective synchronization engine 312 is intended to represent an applicable engine to selectively synchronize network devices with data used to authenticate wireless devices for accessing a network. In selectively synchronizing network devices, the selective synchronization engine 312 can determine which key data to send to which network devices as part of selective synchronization. The selective synchronization engine 312 can use synchronization policies and network groups to determine data to send to specific network devices. For example, if synchronization policies specify that key data of wireless devices mapped to a specific group should be sent to network devices on a first floor of a building, and a wireless device is mapped to the specific group, then the selective synchronization engine can determine to send key data for the wireless device to the network devices on the first floor of the building. Additionally, the selective synchronization engine 312 can perform selective synchronization according to characteristics of network devices. For example, if it is determined that key data for a specific wireless device should be sent to network devices at a specific location, then the selective synchronization engine 312 can determine an identification of the network devices at the specific location, e.g. a MAC address of the network devices, for use in providing the key data to the network devices at the specific location.

In a specific implementation, the selective synchronization engine 312 can set an expiration stamp of data sent to network devices as part of selective synchronization. The selective synchronization engine 312 can set an expiration stamp according to an expiration time of data specified by synchronization policies. For example, if synchronization policies specify to keep key data at network devices for one week after it is sent to the network devices, then the selective synchronization engine 312 can set an expiration stamp of the key data for one week.

In a specific implementation, the selective synchronization engine 312 can selectively synchronize network devices after receiving, from a network administrator, instructions to selectively synchronize the network devices. For example, if a network administrator indicates to selectively synchronize network devices on a first floor of a building with data for device authentication, then the selective synchronization engine 312 can selectively synchronize the network devices on the first floor. In a specific implementation, the selective synchronization engine 312 can selectively synchronize network devices after a specific number of devices have been assigned unique pre-shared keys as part of onboarding. For example, if one thousand wireless devices are onboarded using a unique pre-shared key, then the selective synchronization engine 312 can selectively synchronize network devices to authenticate the wireless devices. In a specific implementation, the selective synchronization engine 312 can selective synchronize a network device after has rebooted, lost power, or undergone an event to cause the network device to lose all or a portion of data saved at the network device.

In the example of FIG. 3, the network device communication engine 314 is intended to represent an applicable engine to communicate with network devices for purposes of selectively synchronizing the network devices. The network device communication engine 314 can provide data to network devices as part of selective synchronization of the network devices. For example the network device communication engine 314 can send key data to a network device according selective synchronization. Further, the network device communication engine 314 can receive a request for key data from a network device after the network device has lost at least a portion of data saved at the network device.

In the example of FIG. 3, the network administrator interface 316 is intended to represent an applicable interface through which a network administrator can communicate with the network device selective synchronization system 302. Through the network administrator interface 316, a network administrator can input instructions to selectively synchronize specific network devices. Additionally, through the network administrator interface 316, a network administrator can provide input regarding synchronization policies.

In an example of operation of the example system shown in FIG. 3, the network device characteristics determination engine 302 determines characteristics of network devices, as indicated by network device characteristics data stored in the network device characteristics datastore 304. In the example of operation of the example system shown in FIG. 3, the synchronization policies management engine 306 maintains synchronization policies for selective synchronizing network devices to authenticate wireless devices as indicated by synchronization policies data stored in the synchronization policies datastore 308. Further, in the example of operation of the example system shown in FIG. 3, the network group datastore 310 stored network group data indicating a network group to which a wireless device has been mapped. In the example of operation of the example system shown in FIG. 3 the selective synchronization engine 312 selective synchronizes a network device by determining key data for the wireless device should be sent to the network device according to characteristics of the network device indicated by network device characteristics data stored in the network device characteristics datastore 304, synchronization policies indicated by synchronization policies data stored in the synchronization policies datastore 308 and the network group to which the wireless device is mapped indicated by network group data stored in the network group datastore 310. Additionally, in the example of operation of the example system shown in FIG. 3, the network device communication engine 314 sends the key data for the wireless device to the network device as part of selective synchronization of the network device.

Figure 4:
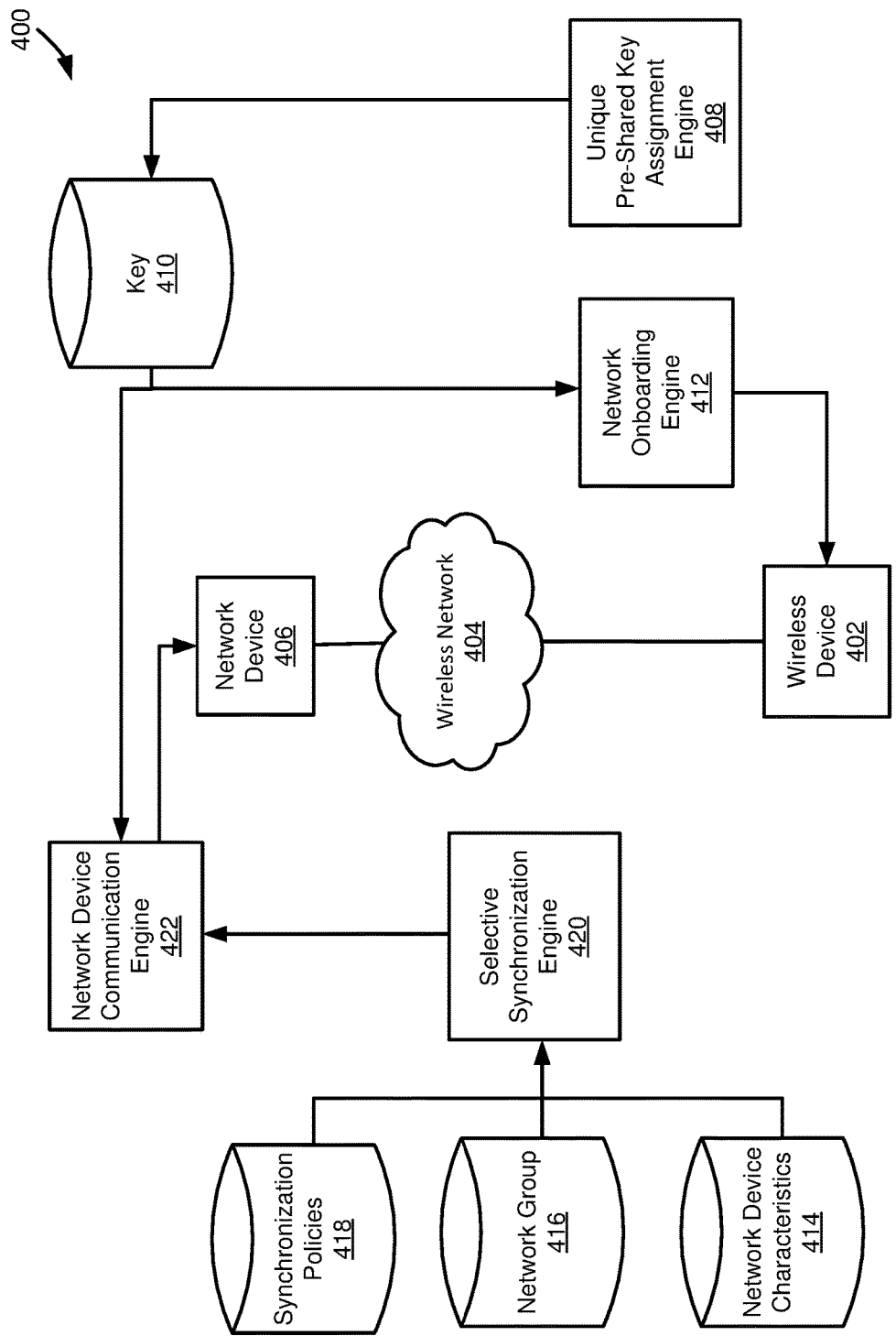
FIG. 4 depicts a diagram of a system for selectively synchronizing network devices to authenticate a wireless device for a network.

FIG. 4 depicts a diagram 400 of a system for selectively synchronizing network devices to authenticate a wireless device for a network. The diagram 400 includes a wireless device 402, a wireless network 404, a network device 406, a unique pre-shared key assignment engine 408, a key datastore 410, a network onboarding engine 412, a network device characteristics datastore 414, a network group datastore 416, a synchronization policies datastore 418, a selective synchronization engine 420, and a network device communication engine 422.

In the example of FIG. 4, the wireless device 402 is intended to represent an applicable device for sending and receiving data through the wireless network 404, such as the wireless devices described in this paper. The wireless device 402 can connect to the network device 406 over a wireless connection as part of the wireless network 404 for purposes of accessing a network through the wireless network 404. In the example of FIG. 4, the network device 406 is intended to represent an applicable device for providing wireless devices access to a network. The wireless device 402 can access network services provided by or through the network using a unique pre-shared key. The network device 406 can directly authenticate the wireless device 402 to access the network with a unique pre-shared key using key data stored locally and received as part of selectively synchronizing the network device 406. The wireless device 402 can be onboarded to access the network using a unique pre-shared key before the wireless device coupes to the network device 406 through the wireless network 404.

In the example of FIG. 4, the unique pre-shared key assignment engine 408 is intended to represent an applicable engine for assigning a unique pre-shared key to the wireless device 402, such as the unique pre-shared key assignment engines described in this paper. In assigning a unique pre-shared key to the wireless device 402, the unique pre-shared key assignment engine 408 can bind an identity of the wireless device 402 or a user of the wireless device to the unique pre-shared key. Further, in assigning a unique pre-shared key to the wireless device 402, the unique pre-shared key assignment engine 408 can update key data stored in the key datastore 410 to indicate a unique pre-shared key assigned to the wireless device 402.

In the example of FIG. 4, the network onboarding engine 412 is intended to represent an applicable engine for onboarding the wireless device 402 to access a network through the wireless network 404 using the unique pre-shared key. The network onboarding engine 412 can onboard the wireless device 402 by providing the unique pre-shared key from key data stored in the key datastore 410 to the wireless device 402. Further, the network onboarding engine 412 can configured the wireless device 402 to access a network through the wireless network 404 using the unique pre-shared key.

In the example of FIG. 4, the network device characteristics datastore 414 is intended to represent an applicable datastore for storing network device characteristics data indicating characteristics of network devices. Network device characteristics data stored in the network device characteristics datastore 414 can indicate characteristics of the network device 406. For example, network device characteristics data stored in the network device characteristics datastore 414 can indicate a physical location of the network device 406.

In the example of FIG. 4, the network group datastore 416 is intended to represent an applicable datastore for storing network group data for selectively synchronizing network devices, such as the network group datastores described in this paper. Network group data stored in the network group datastore 416 can indicate a network group the wireless device 402 or the user of the wireless device 402 has been mapped to according to network personas. Network group data stored in the network group datastore 416 can be maintain by an applicable engine for mapping a user or a wireless device to a network group such as the network persona based mapping engines described in this paper.

In the example of FIG. 4, the synchronization policies datastore 418 is intended to represent an applicable datastore for storing synchronization policies data indicting synchronization policies for purposes of selectively synchronizing network devices to authenticate wireless devices to access a network, such as the synchronization policies datastores described in this paper. The synchronization policies datastore 418 can store synchronization policies data indicating synchronization policies for the network group to which the wireless device 402 is mapped. Synchronization policies data stored in the synchronization policies datastore 418 can be maintained by an applicable engine for maintaining synchronization policies, such as the synchronization management engines described in this paper.

In the example of FIG. 4, the selective synchronization engine 420 is intended to represent an applicable engine for selectively synchronizing network devices to authenticate wireless devices, such as the selective synchronization engines described in this paper. The selective synchronization engine 420 can use network device characteristics data stored in the network device characteristics datastore 414, network group data stored in the network group datastore 416, and synchronization policies data stored in the synchronization policies datastore 418 to selectively synchronize the network device 406 to authenticate the wireless device 402 to access a network. In selectively synchronizing the network device 406, the selective synchronization engine 420 can determine to send key data for the wireless device 402 to the network device 406.

In the example of FIG. 4, the network device communication engine 422 is intended to represent an applicable engine for communicating with network devices for purposes of selectively synchronizing the network devices, such as the network device communication engines described in this paper. The network device communication engine 422 can send the key data for the wireless device 402 to the network device 406 as part of selectively synchronizing the network device 406 to authenticate wireless devices to access the network. The network device 406 can receive the key data for the wireless device 402 as part of selective synchronization before the wireless device 402 couples to the network device 406 through the wireless network 404.

The network device 406 can receive authentication data from the wireless device 402 through the wireless network 404 generated using the unique pre-shared key provided to the wireless device 402 by the network onboarding engine 412. The network device 406 can use the key data provided by the network communication engine 422 and the authentication data provided by the wireless device 402 to directly authenticate at the network device 406 the wireless device 402. For example, the network device 406 can authenticate the wireless device 402 using the authentication data and the key data as part of a 4-way handshake.

Figure 5:
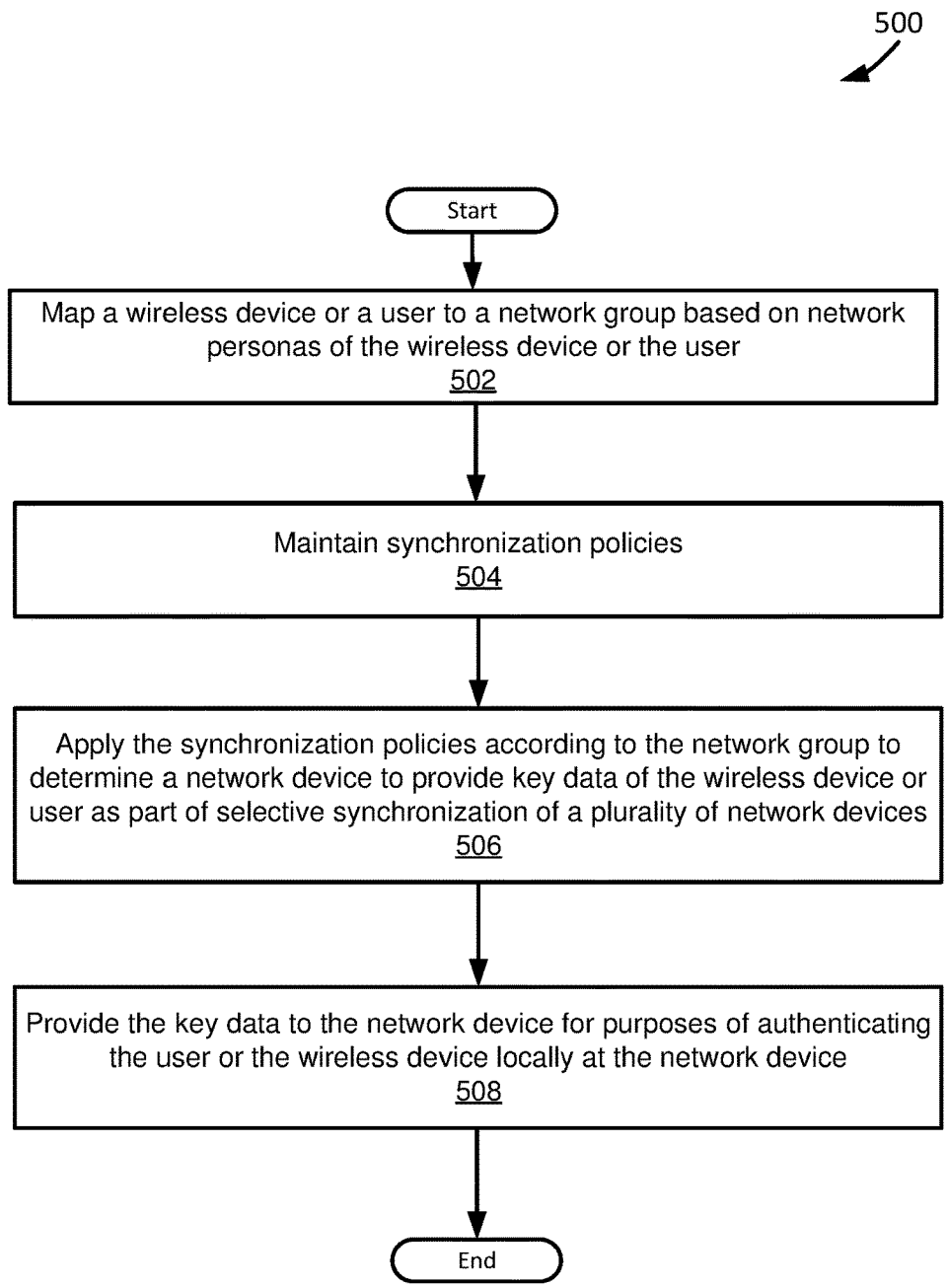
FIG. 5 depicts a flowchart of an example of a method for selectively synchronizing network devices to authenticate wireless devices for a network.

FIG. 5 depicts a flowchart 500 of an example of a method for selectively synchronizing network devices to authenticate wireless devices for a network. The flowchart 500 begins at module 502, where a wireless device or a user is mapped to a network group based on network personas of the wireless device or the user. An applicable engine for mapping wireless devices or users to network groups, such as the network persona based mapping engines described in this paper, can map a wireless device or a user to a network group according to network personas. In mapping a wireless device or a user to a network group, network group data can be updated to indicate a network group to which a wireless device or a user has been mapped.

The flowchart 500 continues to module 504, where synchronization policies are maintained. An applicable engine for maintaining synchronization policies, such as the synchronization policies management engines described in this paper, can maintain synchronization policies. Synchronization policies can be used to selectively synchronize network devices to authenticate wireless devices for accessing a network through a wireless connection. Synchronization policies can be maintained in accordance with input received from a network administrator. Additionally, synchronization policies can be maintained according to network access patterns of wireless devices and/or users.

The flowchart 500 continues to module 506, where the synchronization policies are applied to the network group to determine a network device of a plurality of network devices to provide key data of the wireless device or user to as part of selective synchronization of the plurality of network devices. An applicable engine for selectively synchronizing network devices, such as the selective synchronization engines described in this paper, can selective synchronize a network device of a plurality of network devices with key data of the wireless device or user. As part of selective synchronization, key data to send to a network device and a specific network device to send key data to can be determined. Selective synchronization can be accomplished using network device characteristics data indicating characteristics of a plurality of network devices.

The flowchart 500 continues to module 508, where the key data of the wireless device or the user is provided to the network device as part of selective synchronization for purposes of authenticating the user or the wireless device locally at the network device. An applicable engine for communicating with a network device as part of selective synchronization, such as the network device communication engines described in this paper, can provide the key data to the network device. The network device can stored the key data locally for directly authenticating the wireless device without communicating with a remote system.

Figure 6:
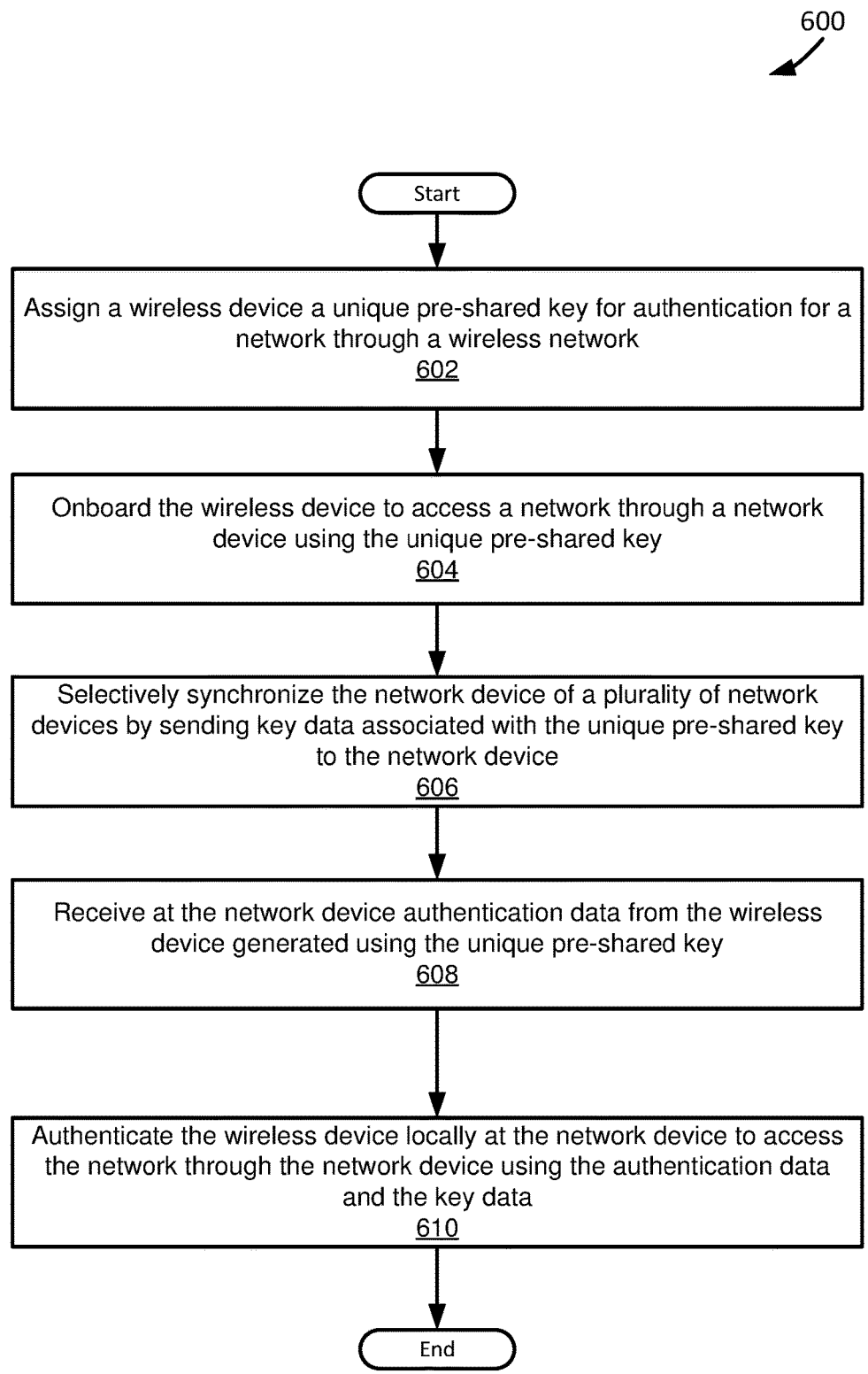
FIG. 6 depicts a flowchart of an example of a method for locally authenticating a wireless device at a network device that has been selective synchronized.

FIG. 6 depicts a flowchart 600 of an example of a method for locally authenticating a wireless device at a network device that has been selective synchronized. The flowchart 600 begins at module 602, where a wireless device is assigned a unique pre-shared key for authenticate of the wireless device for a network through a wireless network. An applicable engine for assigning a unique pre-shared key to wireless devices for authentication purposes, such as the unique pre-shared key assignment engines described in this paper, can assign a unique pre-shared key to a wireless device for authentication purposes. An identity of a wireless device can be bound to a unique pre-shared key assigned to the wireless device for purposes of maintaining network security.

The flowchart 600 continues to module 604, where the wireless device is onboarded to access a network through a network device using the unique pre-shared key. The wireless device can be onboarded to access a network using a unique pre-shared key through a network device over a wireless connection established between the wireless device and the network device. An applicable engine for onboarding a wireless device to access a network using a unique pre-shared key, such as the network onboarding engines described in this paper, can onboard the wireless device to access a network using the unique pre-shared key. In onboarding the wireless device using the unique pre-shared key, the unique pre-shared key can be provided to or displayed at the wireless device. Additionally, in onboarding the wireless device using the unique pre-shared key, the wireless device can be configured to authenticate for a network using the unique pre-shared key.

The flowchart 600 continues to module 606, where the network device of a plurality of network devices is selectively synchronized to authenticate the wireless devices by sending key data associated with the unique pre-shared key to the network device. An applicable system for selectively synchronizing network devices to authenticate wireless devices, such as the network device selective synchronization systems described in this paper, can selectively synchronize the network device to authenticate the wireless device. The network device can be selectively synchronized according to synchronization policies and a network group to which the wireless device or a user of the wireless device is mapped. Additionally, the network device can be selectively synchronized based on characteristics of the network device.

The flowchart 600 continues to module 608, where authentication data generated using the unique pre-shared key is received at the network device from the wireless device. Authentication data can be generated and received using the unique pre-shared key as part of a 4-way handshake. For example, authentication data can be received as part of a second message received from the wireless devices.

The flowchart 600 continues to module 610, where the wireless device is authenticated locally at the network device to access the network through the network device using the authentication data and the key data. The wireless device can be authenticated locally at the network device using the key data stored locally at the network device. Additionally, the wireless device can be authenticated locally at the network device as part of a 4-way handshake.

Figure 7:
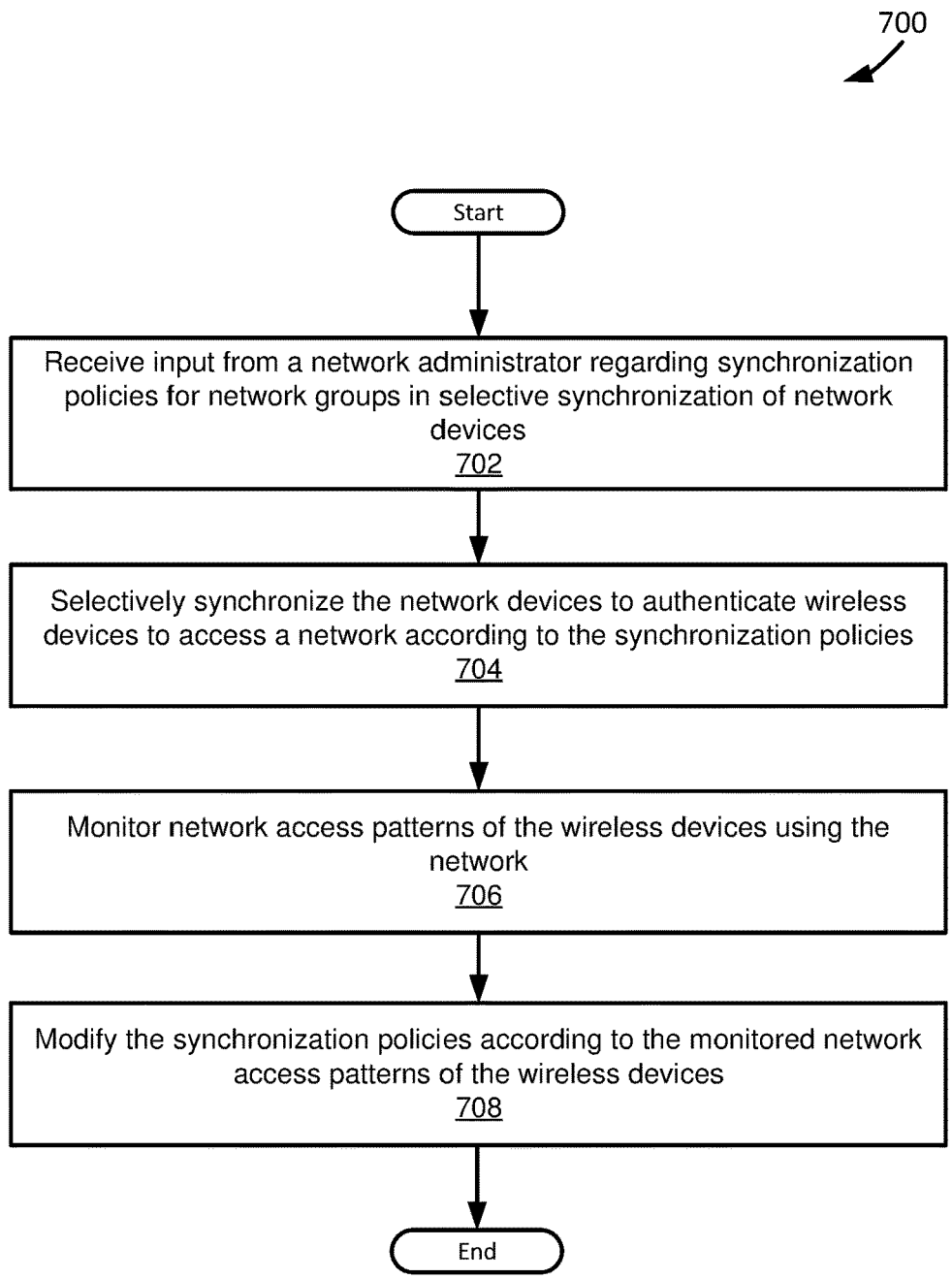
FIG. 7 depicts a flowchart of an example of a method for maintaining synchronization policies for selectively synchronizing network devices to authenticate wireless devices for a network.

FIG. 7 depicts a flowchart 700 of an example of a method for maintaining synchronization policies for selectively synchronizing network devices to authenticate wireless devices for a network. The flowchart begins at module 702, where input from a network administrator regarding synchronization policies for network groups is received. Input regarding synchronization policies can be received from a network administrator through an applicable interface, such as the network administrator interfaces described in this paper.

The flowchart 700 continues to module 704, where the network devices are selectively synchronized to authenticate wireless devices to access a network according to the synchronization policies. An applicable engine for maintain synchronization policies for purposes of selective synchronization of network devices, such as the synchronization policies management engines described in this paper, can maintain synchronization policies according to the input received from the network administrator. An applicable system for selectively synchronizing network devices, such as the network device selective synchronization systems described in this paper, can selectively synchronize the network devices to authenticate wireless devices to access a network according to the synchronization policies.

The flowchart 700 continues to module 706, where network access patterns of the wireless devices in using the network are monitored. An applicable engine for maintaining synchronization policies, such as the synchronization policies management engines described in this paper, can monitor network access patterns of wireless device in using the network. For example, network services the wireless devices utilize can be monitored. In another example, network devices the wireless devices utilize to access the network can be monitored.

The flowchart 700 continues to module 708, where the synchronization policies are modified according to the monitored network access patters of the wireless devices. An applicable engine for maintaining synchronization policies, such as the synchronization policies management engines described in this paper, can modify the synchronization policies according to the monitored network access patterns of the wireless devices.

We claim:

1. A method comprising:
  assigning a unique private pre-shared key to a wireless device, a media access control (MAC) address of the wireless device being bound to the unique private pre-shared key;
  determining network personas of a user of the wireless device;
  mapping the user to a network group according to the network personas of the user;
  maintaining synchronization policies for selectively synchronizing a plurality of network devices to authenticate wireless devices to access a network;
  determining a network device of the plurality of network devices to which to send key data associated with the unique private pre-shared key in accordance with the synchronization policies and the network group and as part of selective synchronization of the plurality of network devices, the key data including the MAC address of the wireless device bound to the unique private pre-shared key;

sending the key data to the network device for storage in local storage of the network device for purposes of locally authenticating the wireless device to access the network.

2. The method of claim 1, wherein the synchronization policies are maintained, at least in part, according to input received from a network administrator of the network.

3. The method of claim 1, wherein the synchronization policies are modified according to network access patterns of wireless devices including the wireless device in accessing the network.

4. The method of claim 1, wherein the network device is configured to authenticate the wireless device to access the network using the key data according to a 4-way handshake.

5. The method of claim 1, further comprising:
determining characteristics of the network devices;
selecting the network device according to the characteristics of the network device.

6. The method of claim 1, further comprising:
determining characteristics of the network devices including physical locations of the network devices;
selecting the network device according to a physical location of the network device.

7. The method of claim 1, wherein the plurality of network devices are selectively synchronized in response to a threshold number of wireless devices being onboarded to access the network using unique pre-shared keys.

8. The method of claim 1, wherein the network personas of the user include the user gaining a right to have key data associated with wireless devices utilized by the user stored locally at the plurality of network devices.

9. The method of claim 1, further comprising sending an expiration stamp with the key data, the expiration stamp specifying a time at which to delete the key data from the local storage of the network device, the expiration stamp set according to an expiration time indicated by the synchronization policies.

10. The method of claim 1, further comprising assigning a connection limit with the unique private pre-shared key, the connection limit specifying a number of wireless devices that can authenticate using the unique private pre-shared key.

11. A system comprising:
a unique private pre-shared key assignment engine configured to assign a unique private pre-shared key to a wireless device, a media access control (MAC) address of the wireless device being bound to the unique private pre-shared key;
a network persona based mapping engine configured to:
determine network personas of a user of the wireless device;
map the user to a network group according to the network personas of the user;
a synchronization policies management engine configured to maintain synchronization policies for selectively synchronizing a plurality of network devices to authenticate wireless devices to access a network;
a selective synchronization engine configured to determine a network device of the plurality of network devices to which to send key data associated with the unique private pre-shared key in accordance with the synchronization policies and the network group and as part of selective synchronization of the plurality of network devices, the key data including the MAC address of the wireless device bound to the unique private pre-shared key;
a network device communication engine configured to send the key data to the network device for storage in local storage of the network device for purposes of locally authenticating the wireless device to access the network.

12. The system of claim 11, wherein the synchronization policies management engine is further configured to maintain the synchronization policies, at least in part, according to input received from a network administrator of the network.

13. The system of claim 11, wherein the synchronization policies management engine is further configured to modify the synchronization policies according to network access patterns of wireless devices including the wireless device in accessing the network.

14. The system of claim 11, wherein the network device is configured to authenticate the wireless device to access the network using the key data according to a 4-way handshake.

15. The system of claim 11, further comprising:
a network device characteristics determination engine configured to determine characteristics of the network devices;
wherein the selective synchronization engine is further configured to select the network device according to the characteristics of the network device.

16. The system of claim 11, further comprising:
a network device characteristics engine configured to determine characteristics of the network devices including physical locations of the network devices;
wherein the selective synchronization engine is further configured to select the network device according to a physical location of the network device.

17. The system of claim 11, wherein the selective synchronization engine is further configured to selectively synchronize the plurality of network devices in response to a threshold number of wireless devices being onboarded to access the network using unique pre-shared keys.

18. The system of claim 11, wherein the network personas of the user include the user gaining a right to have key data associated with wireless devices utilized by the user stored locally at the plurality of network devices.

19. The system of claim 11, wherein the network device communication engine is further configured to send an expiration stamp with the key data, the expiration stamp specifying a time at which to delete the key data from the local storage of the network device, the expiration stamp set according to an expiration time indicated by the synchronization policies.

20. A system comprising:
means for assigning a unique private pre-shared key to a wireless device, a media access control (MAC) address of the wireless device being bound to the unique private pre-shared key;
means for determining network personas of a user of the wireless device;
means for mapping the user to a network group according to the network personas of the user;
means for maintaining synchronization policies for selectively synchronizing a plurality of network devices to authenticate wireless devices to access a network;
means for determining a network device of the plurality of network devices to which to send key data associated with the unique private pre-shared key in accordance with the synchronization policies and the network group and as part of selective synchronization of the plurality of network devices, the key data including the MAC address of the wireless device bound to the unique private pre-shared key;

means for sending the key data to the network device for storage in local storage of the network device for purposes of locally authenticating the wireless device to access the network.

* * * * *